US012746937B2

(12) United States Patent
Park

(10) Patent No.: US 12,746,937 B2
(45) Date of Patent: Sep. 29, 2026

(54) VEHICLE AUTOMATIC CONTROL SYSTEM FOR DRIVER'S DRIVING TENDENCY AND THE CONTROL METHOD THEREFOR

(71) Applicant: HL MANDO CORPORATION, Gyeonggi-do (KR)

(72) Inventor: Byoungjin Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 226 days.

(21) Appl. No.: 18/223,020

(22) Filed: Jul. 17, 2023

(65) Prior Publication Data

US 2024/0262372 A1 Aug. 8, 2024

(30) Foreign Application Priority Data

Feb. 6, 2023 (KR) ........................ 10-2023-0015277

(51) Int. Cl.
*B60W 50/08* (2020.01)
*B60W 10/04* (2006.01)
(Continued)

(52) U.S. Cl.
CPC .......... *B60W 50/085* (2013.01); *B60W 10/04* (2013.01); *B60W 10/18* (2013.01); *B60W 60/001* (2020.02); *B60W 2540/10* (2013.01); *B60W 2540/12* (2013.01); *B60W 2540/18* (2013.01); *B60W 2540/30* (2013.01)

(58) Field of Classification Search
CPC ................. B60W 10/04; B60W 10/18; B60W 2050/0075; B60W 2520/105; B60W 2540/10; B60W 2540/12; B60W 2540/18; B60W 2540/30; B60W 2720/106; B60W 30/14; B60W 40/09; B60W 40/107; B60W 50/085; B60W 60/001
See application file for complete search history.

(56) References Cited

U.S. PATENT DOCUMENTS 11,059,494 B1 * 7/2021 Chan ................. B60W 50/0098
11,247,699 B2 * 2/2022 Omasta .................. B60K 35/26
(Continued)

FOREIGN PATENT DOCUMENTS

CN 111806240 B * 4/2022 ............ B60W 40/00
CN 115503502 A * 12/2022 .......... B60L 15/2045
(Continued)

OTHER PUBLICATIONS

Office Action dated Apr. 19, 2026 for Korean Patent Application No. 10-2023-0015277 and its English translation by Google Translate.

*Primary Examiner* — Babar Sarwar
(74) *Attorney, Agent, or Firm* — WOMBLE BOND DICKINSON (US) LLP

(57) ABSTRACT

Disclosed is a vehicle automatic control system for a driver's driving tendency, which includes: a driving analysis unit analyzing driver's braking and driving acceleration tendencies of a vehicle; a driver tendency learning unit learning the analyzed driver's braking and driving acceleration tendencies; and a driving control unit controlling braking and driving accelerations of the vehicle by applying a predetermined mode-specific map based on the learned driver's braking and driving acceleration tendencies learned by the driver tendency learning unit.

11 Claims, 5 Drawing Sheets

(51) Int. Cl.

| | |
|---|---|
| ***B60W 10/18*** | (2012.01) |
| ***B60W 60/00*** | (2020.01) |

(56) References Cited

U.S. PATENT DOCUMENTS

| | | | | |
|---|---|---|---|---|
| 12,056,722 | B1 * | 8/2024 | Sanchez | G06Q 30/0201 |
| 2003/0093210 | A1 * | 5/2003 | Kondo | B60K 31/0008 701/96 |
| 2010/0292888 | A1 | 11/2010 | Taguchi | |
| 2016/0257309 | A1 * | 9/2016 | Kumar | B60W 30/18027 |
| 2017/0297586 | A1 * | 10/2017 | Li | B60W 50/0097 |
| 2018/0148066 | A1 * | 5/2018 | Okamoto | B60W 40/09 |
| 2018/0281775 | A1 * | 10/2018 | Lee | B60W 20/12 |
| 2019/0001960 | A1 * | 1/2019 | Lee | B60W 10/06 |
| 2020/0377082 | A1 * | 12/2020 | Nassouri | B60W 30/0956 |
| 2021/0039661 | A1 * | 2/2021 | Oh | B60K 35/28 |
| 2021/0171030 | A1 * | 6/2021 | Lee | H04W 4/40 |
| 2021/0362715 | A1 * | 11/2021 | Kim | B60W 30/188 |
| 2022/0063648 | A1 * | 3/2022 | Fishwick | B60W 30/09 |
| 2022/0176986 | A1 * | 6/2022 | Lei | B60W 60/001 |
| 2022/0203996 | A1 * | 6/2022 | Katz | B60W 50/14 |
| 2022/0324446 | A1 * | 10/2022 | Kim | B60W 30/143 |
| 2023/0095869 | A1 * | 3/2023 | Kubatzki | B60W 30/16 701/96 |
| 2023/0227047 | A1 * | 7/2023 | Weicker | B60W 10/18 701/70 |
| 2023/0347903 | A1 * | 11/2023 | Katz | G06V 20/597 |
| 2023/0356717 | A1 * | 11/2023 | Shin | B60W 40/076 |
| 2024/0157970 | A1 * | 5/2024 | Schwegler | B60W 60/0015 |
| 2024/0190457 | A1 * | 6/2024 | Craig | G01C 21/36 |
| 2024/0208481 | A1 * | 6/2024 | Bailey | B60W 50/0097 |
| 2024/0217345 | A1 * | 7/2024 | Ho | B60L 7/26 |

FOREIGN PATENT DOCUMENTS

| | | | | | |
|---|---|---|---|---|---|
| DE | 102010052163 | A1 * | 7/2011 | B60T 8/3255 |
| DE | 10 2019 104 816 | | 8/2020 | |
| EP | 2431244 | A1 * | 3/2012 | G07C 5/085 |
| EP | 3925839 | A1 * | 12/2021 | B60T 7/12 |
| EP | 3313705 | B1 * | 6/2023 | B60W 30/18 |
| GB | 2583847 | A * | 11/2020 | B60W 30/188 |
| GB | 2587715 | A * | 4/2021 | B60K 26/04 |
| JP | 2019018609 | A * | 2/2019 | |
| KR | 102057453 | B1 * | 1/2020 | G06N 3/08 |
| KR | 102462087 | B1 * | 11/2022 | G09B 19/167 |
| KR | 102659048 | B1 * | 4/2024 | B60W 50/082 |
| WO | WO-2018087551 | A1 * | 5/2018 | G08G 1/096861 |

* cited by examiner

| No | Brake pedal stroke[mm] | Target pressure | | | |
|---|---|---|---|---|---|
| | | Normal | | | EBD Fail |
| | | Low SPD | Mid SPD | High SPD | |
| 1 | 3 | 0.5 | 0.5 | 0.5 | 0.5 |
| 2 | 5 | 1.4 | 1.4 | 1.4 | 1 |
| 3 | 7.5 | 2.7 | 2.7 | 2.9 | 1.5 |
| 4 | 11.6 | 4.6 | 4.6 | 4.8 | 2 |
| 5 | 17.5 | 7.7 | 7.7 | 7.8 | 3 |
| 6 | 23.5 | 12.5 | 12.5 | 12.5 | 4.5 |
| 7 | 29.5 | 19.6 | 19.6 | 19.6 | 7 |
| 8 | 35.5 | 29.4 | 29.4 | 29.4 | 12 |
| 9 | 41.5 | 41.8 | 41.8 | 41.8 | 18 |
| 10 | 47.5 | 56.7 | 56.7 | 56.7 | 27 |
| 11 | 53.5 | 74 | 74 | 74 | 37 |
| 12 | 59.5 | 94.1 | 94.1 | 94.1 | 47 |
| 13 | 65.5 | 117.7 | 117.7 | 117.7 | 58 |
| 14 | 71.5 | 146 | 146 | 146 | 71 |
| MAX | 80 | 200 | 200 | 200 | 85 |

VEHICLE AUTOMATIC CONTROL SYSTEM FOR DRIVER'S DRIVING TENDENCY AND THE CONTROL METHOD THEREFOR

CROSS-REFERENCE TO RELATED APPLICATIONS

This application claims priority under 35 U.S.C. § 119 to Korean Patent Application No. 10-2023-0015277, filed on Feb. 6, 2023, in the Korean Intellectual Property Office (KIPO), the disclosure of which is incorporated by reference herein in its entirety.

TECHNICAL FIELD

The present disclosure relates to a vehicle automatic control system for a driver's driving tendency and the control method therefor, and particularly, to a vehicle automatic control system for a driver's driving tendency and the control method therefore, which can learn a driver's braking tendency and a driving acceleration tendency, and automatically set and control a braking deceleration or a driving acceleration according to a driver's driving tendency for each mode.

BACKGROUND

In general, in a system that recognizes the driver's driving tendency and automatically switches the engine and transmission control modes (hereinafter referred to as a driving mode), the driver's driving operation situation such as the acceleration pedal and steering operation is quantified in the form of a sporty index and a predetermined driving mode is designed to operate according to a level of the index.

The driving mode is divided into eco mode, normal mode, and sport mode, and when the sporty index is low (smooth driving), the driving mode ix switched to the eco mode, when the sporty index is average, the driving mode is switched to the normal mode, and when the sporty index is high (extreme driving), the driving mode is switched to the sport mode, and in this way, each driving mode is automatically switched to the corresponding driving mode according to a predetermined index reference.

A pedal effort of a brake pedal of an integrated dynamic brake (IDB) system without a master booster makes a driver to feel a pedal feel, and controls a target pressure generated by a brake pedal travel to form a deceleration of a vehicle.

However, there is a limitation in that there is a difference between a pedal effort provided by automatic control while driving in the system and a pedal effort felt by the driver when braking directly.

SUMMARY

The present disclosure has been made in an effort to provide a vehicle automatic control system for a driver's driving tendency and the control method therefor, which can learn a driver's braking tendency and a driving acceleration tendency, and automatically set and control a braking deceleration or a driving acceleration according to a driver's driving tendency for each mode.

However, a technical object to be achieved by the exemplary embodiment of the present disclosure is not limited to the technical objects and there may be other technical objects.

An exemplary embodiment of the present disclosure provides a vehicle automatic control system for a driver's driving tendency, which includes: a driving analysis unit analyzing driver's braking and driving acceleration tendencies of a vehicle; a driver tendency learning unit learning the analyzed driver's braking and driving acceleration tendencies; and a driving control unit controlling braking and driving accelerations of the vehicle by applying a predetermined mode-specific map based on the driver's braking and driving acceleration tendencies learned by the driver tendency learning unit.

Here, in particular, the vehicle automatic control system further includes a storage unit storing driver's braking and driving acceleration tendency information analyzed by the driving analysis unit and driver's braking and driving acceleration tendency information learned by the driver tendency learning unit.

Here, in particular, the driving analysis unit analyzes braking, an acceleration pedal, and a steering angle change rate of the vehicle.

Here, in particular, the predetermined mode-specific map includes a brake map set to a deceleration level corresponding to a brake pedal travel, and an accelerator map set to an acceleration level corresponding to the acceleration pedal and the steering angle change rate.

Another exemplary embodiment of the present disclosure provides a vehicle automatic control method for a driver's driving tendency, which includes: analyzing driver's braking and driving acceleration tendencies of a vehicle; learning the analyzed driver's braking and driving acceleration tendencies; and controlling braking and driving accelerations of the vehicle by applying a predetermined mode-specific map based on the learned driver's braking driving acceleration tendencies.

Here, in particular, the vehicle automatic control method further includes storing the analyzed driver's braking and driving acceleration tendency information and the learned driver's braking and driving acceleration tendency information after the analysis and the learning.

Here, in particular, in the analysis, braking, an acceleration pedal, and a steering angle change rate of the vehicle are analyzed.

Here, in particular, the predetermined mode-specific map includes a brake map set to a deceleration level corresponding to a brake pedal travel, and an accelerator map set to an acceleration level corresponding to the acceleration pedal and the steering angle change rate.

Here, in particular, in the controlling, the braking and driving accelerations of the vehicle are controlled in response to the driver's braking tendency at a deceleration level of a brake map in a predetermined braking mode based on a driver's vehicle braking tendency.

Here, in particular, in the controlling, the braking and driving accelerations of the vehicle are controlled in response to the driver's driving acceleration tendency at an acceleration level of an accelerator map in a predetermined acceleration mode based on a driver's vehicle driving acceleration tendency.

Here, in particular, the acceleration mode includes the normal mode and the sport mode, and controls the braking and driving accelerations by applying the target spin/yaw rate of the accelerator map according to the driver's set mode.

According to any one of a problem solving means of the present disclosure, the driver's braking tendency and the driving acceleration tendency can be learned, and the braking deceleration or driving acceleration can be automatically set and controlled according to the driver's driving tendency for each mode.

An automatic control is provided so as to suit a driver's direct braking and driving acceleration tendency to satisfy braking and driving acceleration actually felt by a driver.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
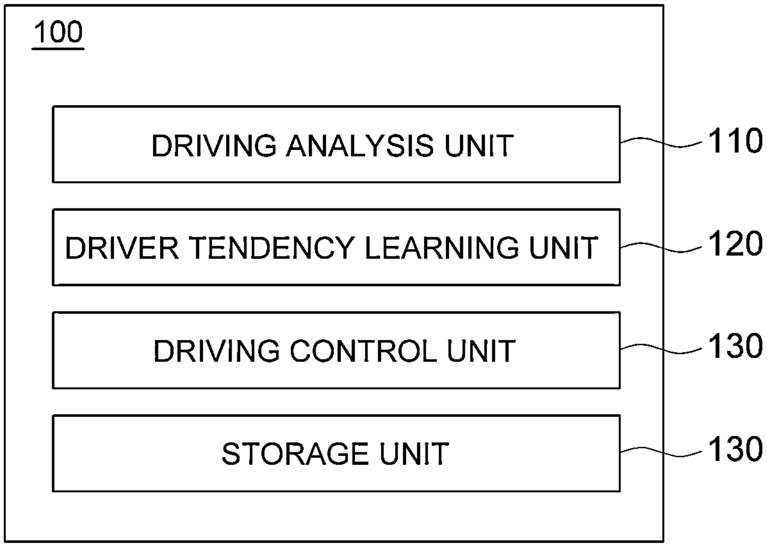
FIG. 1 is a diagram schematically illustrating a configuration of a vehicle automatic control system for a driver's driving tendency according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail so as to be easily implemented by those skilled in the art, with reference to the accompanying drawings. However, the present disclosure may be modified in various different ways, all without departing from the spirit or scope of the present disclosure. In the drawings, in order to clearly describe the present disclosure, a part not related to the description is not omitted and like reference numerals designate like elements throughout the specification. In addition, while describing by referring to the drawings, even components represented by the same name may have a reference numeral which varies depending on the drawing, and the reference numeral is only described for convenience of explanation, and the concept, feature, function or effect of each component is not limited and interpreted by the reference numeral.

Throughout the specification, when it is described that a part is "connected" with another part, it means that the certain part may be "directly connected" with another part and the elements "electrically connected" to each other with a third element interposed therebetween as well. In addition, when any part "includes" any component, it does not mean excluding other components, unless specifically stated to the contrary, but may further include other components, and it should be appreciated that existence or addition possibilities of one or more other features, numbers, steps, operations, components, parts, or combinations thereof are not excluded in advance.

In this specification, 'part' or 'module' includes a unit realized by hardware or software, a unit realized using both directions, and one unit may be realized using two or more hardware, or two or more units may be realized by one hardware.

Figure 2:
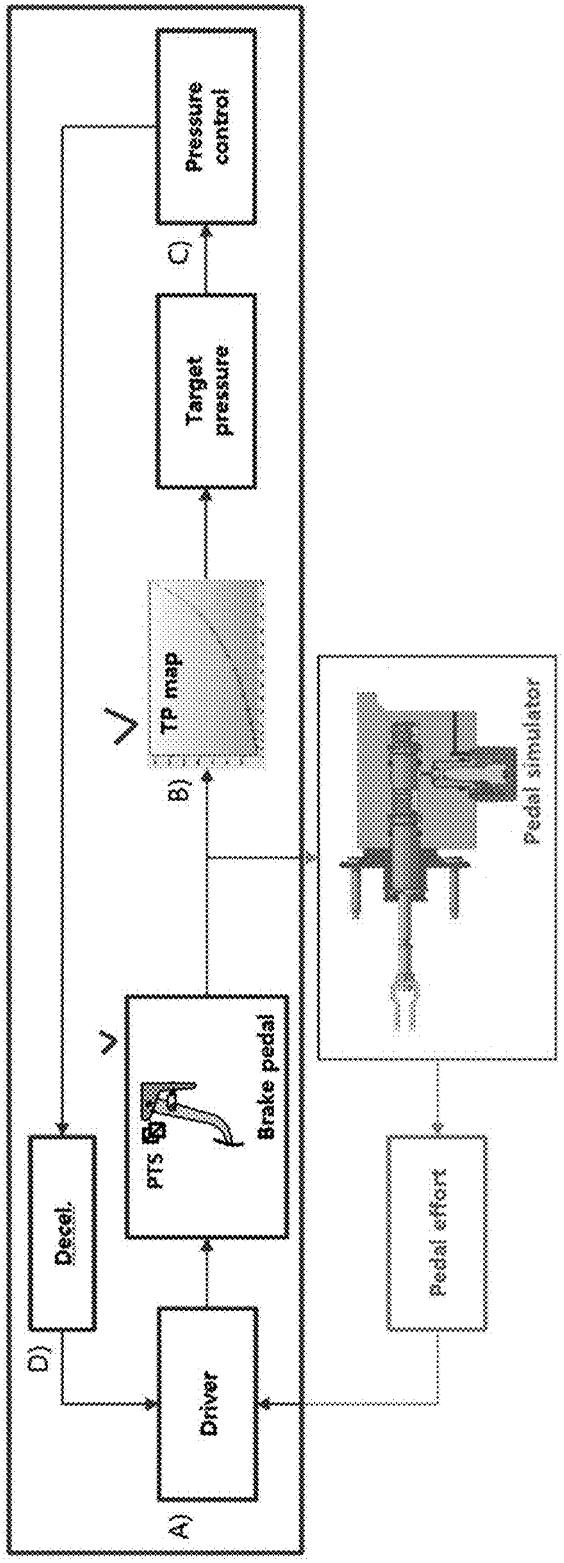
FIG. 2 is a diagram illustrating a schematic example for applying an automatic deceleration control through a driver's braking tendency analysis in the vehicle automatic control system of FIG. 1.
Figure 3:
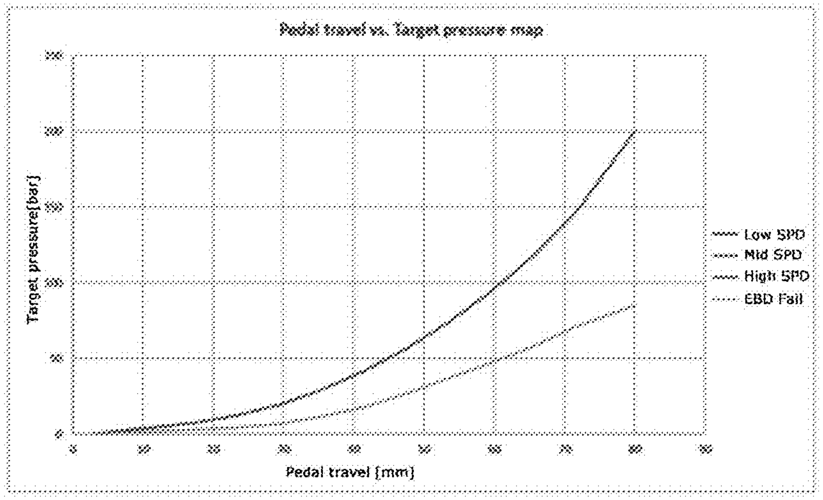
FIG. 3 is a diagram illustrating one example of a brake map level of the present disclosure.
Figure 4:
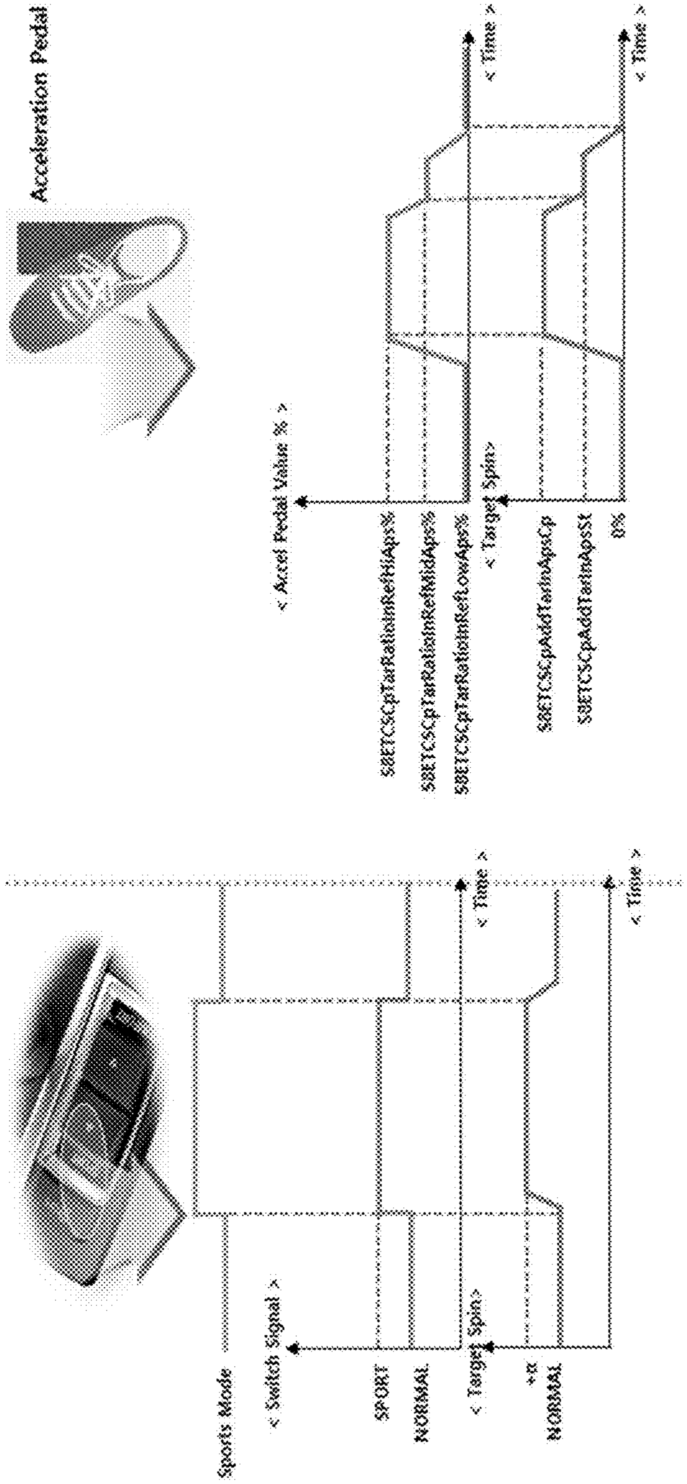
FIG. 4 is a diagram illustrating a value for an example of applying an automatic acceleration control for each driving mode to which the driver's driving tendency analysis of the present disclosure is applied.

FIG. 1 is a diagram schematically illustrating a configuration of a vehicle automatic control system for a driver's driving tendency according to an exemplary embodiment of the present disclosure, FIG. 2 is a diagram illustrating a schematic example for applying an automatic deceleration control through a driver's braking tendency analysis in the vehicle automatic control system of FIG. 1, FIG. 3 is a diagram illustrating one example of a brake map level of the present disclosure, and FIG. 4 is a diagram illustrating a value for an example of applying an automatic acceleration control for each driving mode to which the driver's driving tendency analysis of the present disclosure is applied.

As illustrated in FIG. 1, a vehicle automatic control system 100 for a driver's driving tendency according to an exemplary embodiment of the present disclosure may be configured to include a driver tendency learning unit 120, a driving analysis unit 110, a control unit 130 and a storage unit 140.

The driving analysis unit 110 analyzes a driver braking tendency and a driving acceleration tendency of a vehicle. That is, the driving analysis unit synthetically analyzes a driving habit or tendency according to braking, acceleration pedal, and a steering angle change rate of a driver's vehicle.

More specifically, as illustrated in FIG. 2, the driving analysis unit 110 detects a braking pattern through a brake pedal of the driver in order to analyze the driver's braking tendency. Here, the driver braking pattern means a vehicle deceleration generation pattern through measurement of a degree of stepping the brake pedal upon braking, and an average value is calculated by measuring the driver braking pattern several times to determine the driver's braking tendency.

In this case, as illustrated in FIG. 3, a brake map according to a braking target pressure of pressurization of stepping the brake pedal is set for each level. Here, the braking target pressure may be set according to a depth degree (pressurization) of stepping the brake pedal, and a low speed, a medium speed, and a high speed of the vehicle.

Meanwhile, the predetermined mode-specific map may include a brake map set to a deceleration level corresponding to a brake pedal travel, and an accelerator map set to an acceleration level corresponding to the acceleration pedal and the steering angle change rate.

In this case, a braking pattern may be detected at a corresponding level by analyzing the driver's braking tendency in response to the set brake map.

As illustrated in FIG. 4, the driving analysis unit 110 detects a driving tendency through the acceleration pedal of the driver in order to analyze the driver's driving acceleration tendency.

That is, the depth degree (pressurization), target spin/yaw rate of stepping the acceleration pedal may vary depending on the driver's driving acceleration tendency.

For example, when the driver feels frustrated driving in the normal mode and prefers to drive in the sport driving mode, the driver's driving acceleration tendency may be analyzed based on at least one of pressurization information of the acceleration pedal and steering angle information corresponding to manipulation of a steering wheel.

Even when the driver prefers the driving acceleration tendency in the normal mode, the driver's driving acceleration tendency may be analyzed based on at least one of the pressurization information of the acceleration pedal and the steering angle information corresponding to the manipulation of the steering wheel.

That is, the acceleration pedal according to the pressure of the pressurization of stepping the brake pedal of the driver and the accelerator map set to the acceleration level corresponding to the steering angle change rate may be set for each level (not illustrated).

In this case, the driver's driving acceleration tendency may be analyzed and detected at a corresponding level in response to the set accelerator map.

The driver tendency learning unit 120 learns the driver's braking and driving acceleration tendency analyzed by the driving analysis unit 110.

More specifically, the driving analysis unit 110 analyzes the driver braking tendency in response to the set brake map and analyzes the driver's driving acceleration tendency in response to data of detecting the braking pattern at the corresponding level and the set accelerator map to learn the driver's driving deceleration tendency and acceleration tendency through a learning algorithm based on the data detected at the corresponding level.

For example, the tendency of pressurizing the brake pedal for deceleration by the driver and the driver's driving acceleration tendency corresponding the sport mode or normal mode may be learned.

In this case, even though various drivers commonly use one vehicle, each of the deceleration tendency and the acceleration tendency of each driver may be learned. Further, the driving tendency information for each driver may be calculated and updated through the learning algorithm.

The driving control unit 130 controls braking and driving accelerations of the vehicle by applying a predetermined mode-specific map based on the driver's braking and driving acceleration tendency learned by the driver tendency learning unit 120.

More specifically, the driving acceleration/deceleration tendency of the driver may be matched and controlled by applying the brake map set to the deceleration level corresponding to the predetermined brake pedal travel and the accelerator map set to the acceleration level corresponding to the acceleration pedal and the steering angle change rate based on the driver's braking and driving acceleration tendencies learned by the driver tendency learning unit 120.

For example, if the driver of the vehicle corresponds to the learned driver, the driver driving acceleration/deceleration tendency may be automatically set and controlled as the pressurization information of the brake pedal corresponding thereto, the pressurization information of the acceleration pedal, and information corresponding to the manipulation of the steering wheel. That is, the automatic control is performed according to the driving acceleration/deceleration tendency suitable for the driver.

The storage unit 140 stores the driver's braking and driving acceleration tendency information analyzed by the driving analysis unit 110 and the driver's braking and driving acceleration tendency information learned by the driver tendency learning unit 120.

More specifically, the storage unit 140 analyzes the driver's braking tendency in response to the set brake map by the driving analysis unit 110, and analyzes the driver's driving acceleration tendency in response to the data of detecting the braking pattern at the corresponding level and the set accelerator map to store the data detected at the corresponding level.

The driver braking tendency is analyzed and the driver's driving acceleration tendency is analyzed in response to the data of detecting the braking pattern at the corresponding level and the set accelerator map to store data acquired by learning the driver's driving deceleration tendency and acceleration tendency through the learning algorithm based on the data detected at the corresponding level. In this case, it is preferable to analyze the driving tendency of each of various drivers and store the learning data in one vehicle.

Figure 5:
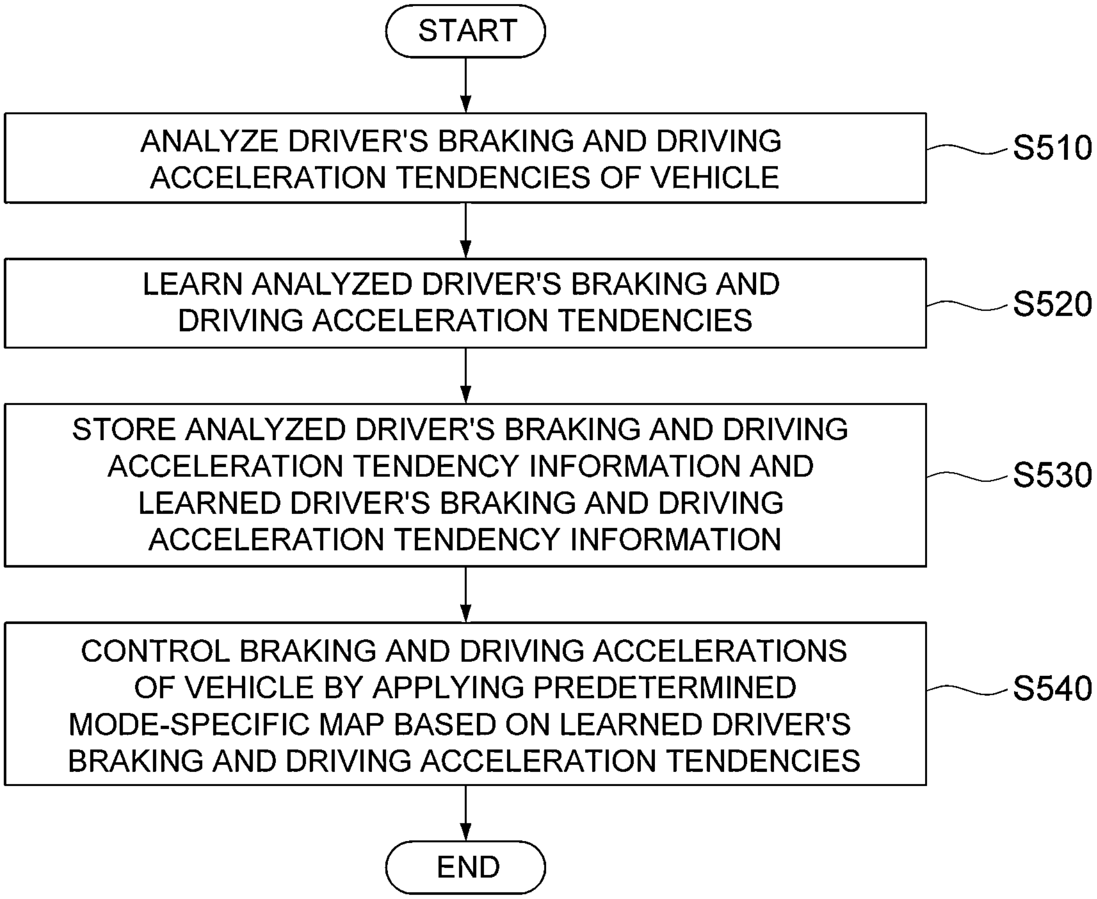
FIG. 5 is a flowchart schematically illustrating a vehicle automatic control method for a driver's driving tendency according to an exemplary embodiment of the present disclosure.

FIG. 5 is a flowchart schematically illustrating a vehicle automatic control method for a driver's driving tendency according to an exemplary embodiment of the present disclosure.

As illustrated in FIG. 5, first, a step of analyzing the driver' braking and driving acceleration tendency of the vehicle is performed (S510).

The driver's braking tendency and the driving acceleration tendency of the vehicle are analyzed. That is, the driving analysis unit synthetically analyzes a driving habit or tendency according to braking, acceleration pedal, and a steering angle change rate of a driver's vehicle.

More specifically, the braking pattern through the brake pedal of the driver is detected in order to analyze the driver's braking tendency. Here, the driver braking pattern means a vehicle deceleration generation pattern through measurement of a degree of stepping the brake pedal upon braking, and an average value is calculated by measuring the driver braking pattern several times to determine the driver's braking tendency.

In this case, the brake map according to the braking target pressure of pressurization of stepping the brake pedal is set for each level. Here, the braking target pressure may be set according to a depth degree (pressurization) of stepping the brake pedal, and a low speed, a medium speed, and a high speed of the vehicle.

Meanwhile, the predetermined mode-specific map may include a brake map set to a deceleration level corresponding to a brake pedal travel, and an accelerator map set to an acceleration level corresponding to the acceleration pedal and the steering angle change rate.

In this case, a braking pattern may be detected at a corresponding level by analyzing the driver's braking tendency in response to the set brake map.

The driving tendency through the acceleration pedal of the driver is detected in order to analyze the driver's driving acceleration tendency.

That is, the depth degree (pressurization), target spin/yaw rate of stepping the acceleration pedal may vary depending on the driver's driving acceleration tendency.

For example, when the driver feels frustrated driving in the normal mode and prefers to drive in the sport driving mode, the driver's driving acceleration tendency may be analyzed based on at least one of pressurization information of the acceleration pedal and steering angle information corresponding to manipulation of a steering wheel.

Even when the driver prefers the driving acceleration tendency in the normal mode, the driver's driving acceleration tendency may be analyzed based on at least one of the pressurization information of the acceleration pedal and the steering angle information corresponding to the manipulation of the steering wheel.

That is, the acceleration pedal according to the pressure of the pressurization of stepping the brake pedal of the driver and the accelerator map set to the acceleration level corresponding to the steering angle change rate may be set for each level (not illustrated).

In this case, the driver's driving acceleration tendency may be analyzed and detected at a corresponding level in response to the set accelerator map.

A step of learning the analyzed driver's braking and driving acceleration tendency is performed (S520).

More specifically, the driver braking tendency is analyzed in response to the set brake map and the driver's driving acceleration tendency is analyzed in response to data of detecting the braking pattern at the corresponding level and the set accelerator map to learn the driver's driving deceleration tendency and acceleration tendency through a learning algorithm based on the data detected at the corresponding level.

For example, the tendency of pressurizing the brake pedal for deceleration by the driver and the driver's driving acceleration tendency corresponding the sport mode or normal mode may be learned.

In this case, even though various drivers commonly use one vehicle, each of the deceleration tendency and the acceleration tendency of each driver may be learned. Further, the driving tendency information for each driver may be calculated and updated through the learning algorithm.

Subsequently, after the analysis step and the learning step, a step of storing the analyzed driver's braking and driving acceleration tendency information and the learned driver's braking and driving acceleration tendency information is performed (S530).

More specifically, the driver's braking tendency is analyzed in response to the set brake map, and the driver's driving acceleration tendency is analyzed in response to the data of detecting the braking pattern at the corresponding level and the set accelerator map to store the data detected at the corresponding level.

The driver braking tendency is analyzed and the driver's driving acceleration tendency is analyzed in response to the data of detecting the braking pattern at the corresponding level and the set accelerator map to store data acquired by learning the driver's driving deceleration tendency and acceleration tendency through the learning algorithm based on the data detected at the corresponding level. In this case, it is preferable to analyze the driving tendency of each of various drivers and store the learning data in one vehicle.

Next, a step of controlling braking and driving accelerations of the vehicle by applying a predetermined mode-specific map based on the learned driver's braking and driving acceleration tendencies is performed (S540).

The driving acceleration/deceleration tendency of the driver may be matched and controlled by applying the brake map set to the deceleration level corresponding to the predetermined brake pedal travel and the accelerator map set to the acceleration level corresponding to the acceleration pedal and the steering angle change rate based on the driver's braking and driving acceleration tendencies learned by the driver tendency learning unit 120.

That is, in the controlling step, the braking and acceleration tendency is controlled in response to the driver's braking tendency at the deceleration level of the brake map in the predetermined braking mode based on the driver's vehicle braking tendency, and controlled in response to the driver's driving acceleration tendency at the acceleration level of the accelerator map in the predetermined acceleration mode based on the driver's vehicle driving acceleration tendency. Here, the acceleration mode includes the normal mode and the sport mode, and may control the braking and driving acceleration by applying the target spin/yaw rate of the accelerator map according to the driver's set mode.

For example, if the driver of the vehicle corresponds to the learned driver, the driver driving acceleration/deceleration tendency may be automatically set and controlled as the pressurization information of the brake pedal corresponding thereto, the pressurization information of the acceleration pedal, and information corresponding to the manipulation of the steering wheel. That is, the automatic control is performed according to the driving acceleration/deceleration tendency suitable for the driver.

The aforementioned description of the present disclosure is used for exemplification, and it can be understood by those skilled in the art that the present disclosure can be easily modified in other detailed forms without changing the technical spirit or requisite features of the present disclosure. Therefore, it should be appreciated that the aforementioned embodiments are illustrative in all aspects and are not restricted. For example, respective constituent elements described as single types can be distributed and implemented, and similarly, constituent elements described to be distributed can also be implemented in a coupled form.

The scope of the present disclosure is represented by claims to be described below rather than the detailed description, and it is to be interpreted that the meaning and scope of the claims and all the changes or modified forms derived from the equivalents thereof come within the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle automatic control system for a driver's driving tendency, comprising:

a driving analyzer analyzing driver's braking and driving acceleration tendencies of a vehicle;

a driver tendency learning module learning the analyzed driver's braking and driving acceleration tendencies; and a driving controller controlling braking and driving accelerations of the vehicle by applying a predetermined mode-specific map based on the analyzed driver's braking and driving acceleration tendencies learned by the driver tendency learning module;

wherein the predetermined mode-specific map includes a brake map set to a deceleration level corresponding to a brake pedal travel, and an accelerator map set to an acceleration level corresponding to acceleration pedal and steering angle change rate;

wherein the driving analyzer analyzes a driver's braking tendency corresponding to the set brake map and detects a braking pattern corresponding to a corresponding level, and analyzes a driver's acceleration tendency corresponding to the set accelerator map and detects an acceleration pattern corresponding to a corresponding level;

wherein the driver tendency learning module learns, through a learning algorithm, a driver's deceleration tendency and acceleration tendency based on data representing the detected braking pattern corresponding to the brake map and data representing the detected acceleration pattern corresponding to the accelerator map; and wherein the learned braking tendency and driving acceleration tendency are used to generate and update the brake map and the accelerator map, and to control the steering angle change rate together with braking and driving accelerations.

2. The vehicle automatic control system of claim 1, further comprising:

a storage module storing driver's braking and driving acceleration tendency information analyzed by the driving analyzer and the driver's braking and driving acceleration tendency information learned by the driver tendency learning module.

3. The vehicle automatic control system of claim 1, wherein the driving analyzer analyzes braking, an acceleration pedal, and a steering angle change rate of the vehicle.

4. The vehicle automatic control system of claim 1, wherein the brake map includes target pressure values for each vehicle speed range (low, medium, and high) based on the depth of brake pedal depression (pedal stroke amount).

5. The vehicle automatic control method of claim 1, wherein in the controlling, the braking and driving accelerations of the vehicle are controlled in response to the driver's driving acceleration tendency at the acceleration level of the accelerator map in a predetermined acceleration mode based on a driver's vehicle driving acceleration tendency.

6. The vehicle automatic control method of claim 5, wherein the predetermined acceleration mode includes normal mode and sport mode, and controls the braking and driving accelerations by applying target spin/yaw rate of the accelerator map according to driver's set mode.

7. A vehicle automatic control method for a driver's driving tendency, comprising:

analyzing driver's braking and driving acceleration tendencies of a vehicle;

learning the analyzed driver's braking and driving acceleration tendencies; and controlling braking and driving accelerations of the vehicle by applying a predetermined mode-specific map based on the learned driver's braking driving and acceleration tendencies;

wherein the predetermined mode-specific map includes a brake map set to a deceleration level corresponding to a brake pedal travel, and an accelerator map set to an acceleration level corresponding to acceleration pedal and steering angle change rate;

wherein analyzing the driver's braking and driving acceleration tendencies includes analyzing a driver's braking tendency corresponding to the brake map and detecting a braking pattern corresponding to a corresponding deceleration level, and analyzing a driver's acceleration tendency corresponding to the accelerator map and detecting an acceleration pattern corresponding to a corresponding acceleration level;

wherein learning includes learning, through a learning algorithm, a driver's braking tendency and driving acceleration tendency based on data representing the detected braking pattern corresponding to the brake map and data representing the detected acceleration pattern corresponding to the accelerator map; and wherein the learned braking and driving acceleration tendencies are used to generate and update the brake map and the accelerator map, and to control the steering angle change rate together with braking and driving accelerations.

8. The vehicle automatic control method of claim 7, further comprising:

storing analyzed driver's braking and driving acceleration tendency information and learned driver's braking and driving acceleration tendency information after the analysis and the learning.

9. The vehicle automatic control method of claim 7, wherein in the analysis, braking, an acceleration pedal, and a steering angle change rate of the vehicle are analyzed.

10. The vehicle automatic control method of claim 7, wherein the brake map includes target pressure values for each vehicle speed range (low, medium, and high) based on the depth of brake pedal depression (pedal stroke amount).

11. The vehicle automatic control method of claim 1, wherein in the controlling, the braking and driving accelerations of the vehicle are controlled in response to the driver's braking tendency at a deceleration level of a brake map in a predetermined braking mode based on a driver's vehicle braking tendency.

* * * * *